(12) United States Patent
Bocquet et al.

(10) Patent No.: US 8,907,598 B2
(45) Date of Patent: Dec. 9, 2014

(54) METHOD FOR OPERATING AN ACTUATOR FOR MANOEUVRING A WINDABLE MOBILE ELEMENT OF A HOME AUTOMATION APPLIANCE AND ACTUATOR OPERATING ACCORDING TO THIS METHOD

(75) Inventors: Jean-François Bocquet, Sallanches (FR); Anne-Sophie Cleguer, La Roche-sur-Foron (FR); Florian Germain, Meythet (FR); David Mugnier, Pers-Jussy (FR)

(73) Assignee: Somfy SAS, Cluses (FR)

( * ) Notice: Subject to any disclaimer, the term of this patent is extended or adjusted under 35 U.S.C. 154(b) by 387 days.

(21) Appl. No.: 13/272,495

(22) Filed: Oct. 13, 2011

(65) Prior Publication Data

US 2012/0090242 A1   Apr. 19, 2012

(30) Foreign Application Priority Data

Oct. 13, 2010 (FR) .................................... 10 58324

(51) Int. Cl.
*H02P 7/00* (2006.01)
*G05B 19/416* (2006.01)
*E05F 15/10* (2006.01)
*E06B 9/68* (2006.01)
*E05F 15/16* (2006.01)

(52) U.S. Cl.
CPC ......... *G05B 19/416* (2013.01); *E05Y 2400/514* (2013.01); *E05Y 2900/00* (2013.01); *G05B 2219/43082* (2013.01); *E05F 15/16* (2013.01); *E05F 15/10* (2013.01); *G05B 2219/45015* (2013.01); *E05Y 2400/40* (2013.01); *E06B 9/68* (2013.01)

USPC .......... 318/266; 318/280; 318/286; 318/466; 318/799

(58) Field of Classification Search
USPC ......... 318/265, 268, 272, 280, 282, 286, 466, 318/467, 468, 799, 266, 779, 599; 388/819, 388/823
See application file for complete search history.

(56) References Cited

U.S. PATENT DOCUMENTS

| 7,362,068 B2 * | 4/2008 | Yamamoto ..................... 318/469 |
| 8,093,849 B2 * | 1/2012 | Shibata ......................... 318/466 |
| 2001/0037600 A1 | 11/2001 | Hormann |

(Continued)

FOREIGN PATENT DOCUMENTS

| EP | 1120528 A | 8/2001 |
| EP | 1510649 A | 3/2005 |

(Continued)

OTHER PUBLICATIONS

Search report from French Patent Office for priority application FR 1058324 dated Mar. 28, 2011.

*Primary Examiner* — Antony M Paul
(74) *Attorney, Agent, or Firm* — Frommer Lawrence & Haug LLP; Ronald R. Santucci

(57) ABSTRACT

Method for operating an actuator for maneuvering a windable mobile element of a home automation appliance, the mobile element being able to be displaced between two extreme positions, the method comprising a first step for definition of a first angular speed setpoint of the actuator in a first docking area and a second step for definition of a second angular speed setpoint of the actuator in a second docking area, the first and second angular speed setpoints being different.

18 Claims, 3 Drawing Sheets

(56) References Cited

U.S. PATENT DOCUMENTS

2004/0027081 A1 2/2004 Cheron
2005/0039865 A1 2/2005 Bruno et al.
2006/0197481 A1* 9/2006 Hotto et al. .................. 318/280
2010/0231156 A1 9/2010 Grehant et al.

FOREIGN PATENT DOCUMENTS

| EP | 2015156 A | 1/2009 |
|----|-----------|--------|
| WO | WO 02/23005 A | 3/2002 |
| WO | WO 2007/080493 A | 7/2007 |
| WO | WO 2009/050664 A | 4/2009 |

* cited by examiner

METHOD FOR OPERATING AN ACTUATOR FOR MANOEUVRING A WINDABLE MOBILE ELEMENT OF A HOME AUTOMATION APPLIANCE AND ACTUATOR OPERATING ACCORDING TO THIS METHOD

This application claims priority benefits to French patent application number 10 58324 filed Oct. 13, 2010, the entire disclosure of which is incorporated herein by reference.

The invention relates to the field of electromechanical actuators used for the motorized control of the mobile closure, blanking or solar protection elements, such as roller shutters, with which the openings in a building are equipped. In particular, it relates to an electromechanical actuator with variable control speed.

Such an actuator is described in the document EP 1 120 528 A2, which explains that the control speed of the actuator (or angular speed of the rotor or of the output shaft) can be regulated according to the position of the apron of the mobile element, so that the speed of displacement of the apron is constant, in particular over most of the travel. In practice, given the physical characteristics of the mobile elements (for example, presence of a weight compensation device, diameter of the winding tube, thickness of the slats of the element), a constant control speed is reflected as variations in the speed of displacement of the final slat of the mobile element. To obtain a constant displacement speed (or linear speed), it is therefore necessary to take account of the particular physical features of the installation when calculating the control speed to be applied.

As is described in this document, a displacement speed difference is desirable and generally enforced, in the areas close to the extreme positions, or end-of-travel positions, relative to the linear speed over the travel. The departures from and/or arrivals at end of travel are therefore carried out at reduced speed, so as to protect the installation against impacts and to reduce operating noises.

This document, however, has nothing to say concerning the processing of the speed in each docking area, that is to say, in each area of arrival in proximity to an extreme position.

Also known, from the document WO2007/080493, are various methods for determining, for a given installation, the winding radius or the variations thereof during the winding of the roller shutter.

The document WO2002/23005 also describes a control method in which the angular speed is varied in order to reduce the power supply voltage and to obtain a reduced torque when approaching the end stops. This method is applicable to the asynchronous-type motors which have a torque/speed characteristic such that the torque decreases with the power supply voltage.

Alternatively, or in a complementary manner, it is known, from the document WO2009/050664, to vary the detection sensitivity for a force depending on whether the load is a driving load or a driven load. In particular, the setpoint for sensitivity of detection of a top end stop is different from the setpoint for sensitivity of detection of a bottom end stop. Thus, it is possible to adapt the detection of a force at the end stop to the characteristics of an upward movement or of a downward movement.

However, not one of these documents seeks to parameterize the speed behaviours of the two top and bottom docking areas, in particular one as a function of the other, notably to make them uniform or to differentiate them deliberately.

Document EP 2015156 discloses a method of operation of an actuator for manoeuvring a windable component in which the docking areas are defined by durations of activation of the actuator.

The aim of the invention is to provide an actuator operating method that remedies the drawbacks mentioned above and improves on the methods known from the prior art. In particular, the invention proposes an operating method that optimizes the behaviour of the actuators when manoeuvring mobile elements in the docking areas and that enhances the quality perceived by the users of home automation devices that include such actuators.

The method according to the invention governs the operation of an actuator for manoeuvring a windable mobile element of a home automation appliance such that the mobile element can be displaced between two extreme positions. The method comprises a first step for definition of a first angular speed setpoint of the actuator in a first docking area and a second step for definition of a second angular speed setpoint of the actuator in a second docking area, the first and second angular speed setpoints being different.

At least one of the first and second angular speed setpoints can be obtained from the definition of a first linear speed setpoint of the mobile element in the first docking area or of a second linear speed setpoint of the mobile element in the second docking area.

The first and second linear speed setpoints may be defined as a common or substantially common linear speed setpoint of the mobile element in the first and second docking areas, in particular as a common or substantially common linear speed setpoint of the mobile element on arrival at the extreme positions.

The first and second linear speed setpoints may be defined by a set ratio relative to one another.

The angular speed of the actuator in the docking areas decreases from the entry into a docking area until the angular speed setpoint value defined for each docking area is reached on arrival of the mobile element in each of the extreme positions.

The angular speed decreasing phases may be different in the two docking areas, in particular different in that the forms of the decreasing profiles are different.

The angular or linear speed setpoint corresponding to a docking area can be reached when a so-called approach area part of the docking area has been covered, in particular when ⅔ of the docking area have been covered.

The angular or linear speed may remain equal to the setpoint over a so-called proximity area of the docking area.

The speeds of displacement of the mobile element may be reduced in the docking areas relative to the speed of displacement over the rest of the travel.

The angular speed of the actuator outside of the docking areas may be constant or substantially constant.

The first and second angular speed setpoints may be defined by using values, in particular approximate values, of the winding diameter of the mobile element on approaching each extreme position.

According to the invention, an electromechanical actuator for manoeuvring a windable mobile element of a home automation appliance, intended to drive the mobile element between two extreme positions, comprises hardware and/or software means for implementing the operation method defined previously.

The hardware and/or software means may comprise a means for defining a first angular speed setpoint of the actuator in a first docking area, a means for defining a second angular speed setpoint of the actuator in a second docking area and a means for regulating the speed of rotation of its output shaft so as to regulate the speed of the actuator to one and/or the other of the first and second setpoints.

According to the invention, a home automation installation includes an actuator as defined previously.

The invention also relates to a computer-readable data storage medium, on which is stored a computer program comprising computer program code means for implementing the phases and/or steps of the operating method defined previously.

The invention also relates to a computer program comprising a computer program code means suitable for carrying out the phases and/or steps of the operating method defined previously, when the program runs on a computer.

The invention will be better understood on reading the following description, given solely as an example, and with reference to the appended drawings in which.

Figure 1:
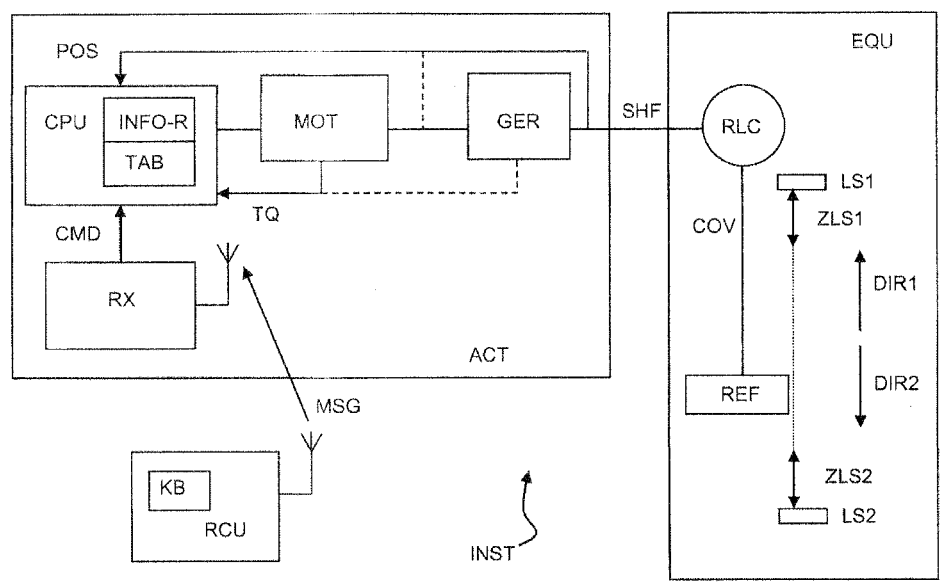
FIG. 1 represents, in the form of a functional diagram, a home automatic installation provided with an actuator according to the invention.

The installation INST, represented in FIG. 1, comprises an actuator ACT, in particular a tubular electromechanical actuator, provided with a motor MOT whose output shaft drives a reducing gear GER. The output shaft SHF of the reducing gear GER constitutes the output shaft of the actuator. It is kinematically linked to a home automation appliance EQU, in particular to a winding tube RLC of the home automation appliance. A windable mobile element COV is intended to be wound onto this tube. By controlling the electrical power supply to the motor, the displacements of the windable mobile element are thus controlled. The lower end of the windable mobile element COV is attached to a final slat REF. The home automation appliance may in particular consist of a roller shutter, an access door or a blind installed in a building.

The motor MOT is activated in a first direction or in a second direction by a unit CPU controlling the power supply to the motor MOT, this unit comprising, for example, a microcontroller. The control unit receives control commands using a link CMD linking it to a command receiver RX. The commands are transmitted using a remote control interface RCU, for example a mobile remote control interface, provided with a human-machine interface KB that has at least one control key. Preferentially, the remote control interface RCU communicates by radiofrequency waves with the command receiver, as represented by the arrow MSG. Preferentially, the link between the control interface and the command receiver is of bidirectional type, which makes it possible to display on the remote control interface RCU messages relating to the state of the actuator. Alternatively, the communication may be of wired type.

A first internal quantity POS relating to the rotation of the motor is measured by the control unit CPU. This quantity is preferentially given by the output from a rotation sensor positioned, for example, at the output of the reducing gear GER. It gives, by way of indication, information concerning the position of the final slat. Alternatively, the rotation sensor may be positioned at the output of the motor MOT, as represented by a broken line. In a variant, the internal quantity POS relating to the rotation of the motor is the motor activation time. In this case, this quantity is measured by a time counter of the microcontroller included in the control unit CPU.

A second internal quantity TQ relating to the mechanical torque supplied by the motor is measured directly on the motor, as indicated by a solid line arrow, by using the intensity of the current if the motor is a DC motor with permanent magnets or by using the voltage at the terminals of the phase-shifting capacitor if the motor is a single-phase induction motor with permanent capacitor. Alternatively, the torque TQ is measured indirectly on the reducing gear, as indicated by a broken line, or in any other part of the actuator.

In each case, a combination of the different variants can also be used to define the internal quantities. The internal quantities may also be obtained by calculation on the basis of a parameter measured on the actuator or the mobile element itself.

The angular speed may be obtained from one or more of these internal quantities.

The translational displacement of the final slat is limited by a first top end-of-travel end stop LS1 and/or by a second bottom end-of-travel end stop LS2. Alternatively, the limits are set by storing counting values corresponding to these extreme positions in the control unit.

In proximity to each of these end-of-travel positions, a so-called docking area ZLS1 and ZLS2 is defined, in which the behaviour of the actuator is modified, in particular on approaching the top end of travel when raised, that is to say, in a first direction DIR1, and on approaching the bottom end of travel when lowered, that is to say in a second direction DIR2.

The displacement behaviour of the windable element is preferentially different in the docking areas when the windable element leaves the end-of-travel positions.

Because of the thickness of the windable mobile element (for example, the thickness of the slats of a roller shutter, these being wound one over the other around the winding tube), the winding radius thereof may vary greatly with its degree of opening, that is to say, with the linear position of the final slat REF.

In particular, it is in proximity to the bottom end of travel, respectively the top end of travel, that is to say, in the two top and bottom docking areas, that the winding radius is at its minimum, respectively maximum. The result of this is that, for one and the same control speed setpoint for the actuator, the linear displacement speeds of the final slat will be radically different: the linear displacement speed in the top docking area consequently being much greater than the linear displacement speed in the bottom docking area for one and the same speed of rotation of the winding tube. The direction of displacement may also influence the linear speed, as well as the mechanical characteristics of the installation.

Without taking account of the winding diameter, a choice of control speed setpoint for a docking area ZLS1 toward the top identical to the control speed setpoint adapted to the descent into the bottom docking area ZLS2 would cause the docking speed towards the top to be too great and would result in mechanical stresses on the mobile element on each cycle. In this case, regardless of the force detection sensitivity, the inertia of the mobile element would result in an abrupt stop at the top end of travel. This would cause impacts, high stresses on the brake, or overheating. Conversely, a choice of control speed setpoint for a docking area ZLS2 towards the bottom identical to the control speed setpoint adapted to the rise into the top docking area ZLS1 would cause the docking speed towards the bottom to be too low. This choice would result in a surprising behaviour and would excessively extend the time it takes to close the shutter. Furthermore, it could result in untimely stoppages before the arrival at the bottom end of travel.

An appropriate choice of linear speed makes it possible to visually observe a change in the displacement of the screen, makes it possible to stack the slats of a roller shutter with flexibility, and to reduce the risks of pinching (between the sill of a window and the mobile element or between a box part of the mobile element and the mobile element).

Regardless of the conditions influencing the linear speed, it is desirable to obtain a harmonious operation of the windable mobile element. In particular, it is important for the linear speed of the final slat to be reduced before the arrival at the end-of-travel position, on raising or on lowering. In addition to the fact that it improves the impression of quality perceived by the user, this operation protects the windable mobile element and the installation itself.

In the stop phases, that is to say, on entry into a docking area, the invention proposes regulating the control speed setpoint to provide a decrease in the linear speed of the mobile element in the docking area. Moreover, by taking account in particular of the differences in radius or winding diameter, two control speed setpoints are applied for a displacement in the top docking area towards the top end of travel and in the bottom docking area towards the bottom end of travel. These control speed setpoints are determined to parameterize the linear speeds in the two docking areas so as to incorporate the differences linked to the installation in the top docking area and the bottom docking area. In particular, the speed setpoints are defined in association with one another. A particular example of this parameterizing is to obtain substantially identical linear speeds. Another example consists in obtaining a set ratio between the linear speeds in the top docking area and in the bottom docking area.

Figure 2:
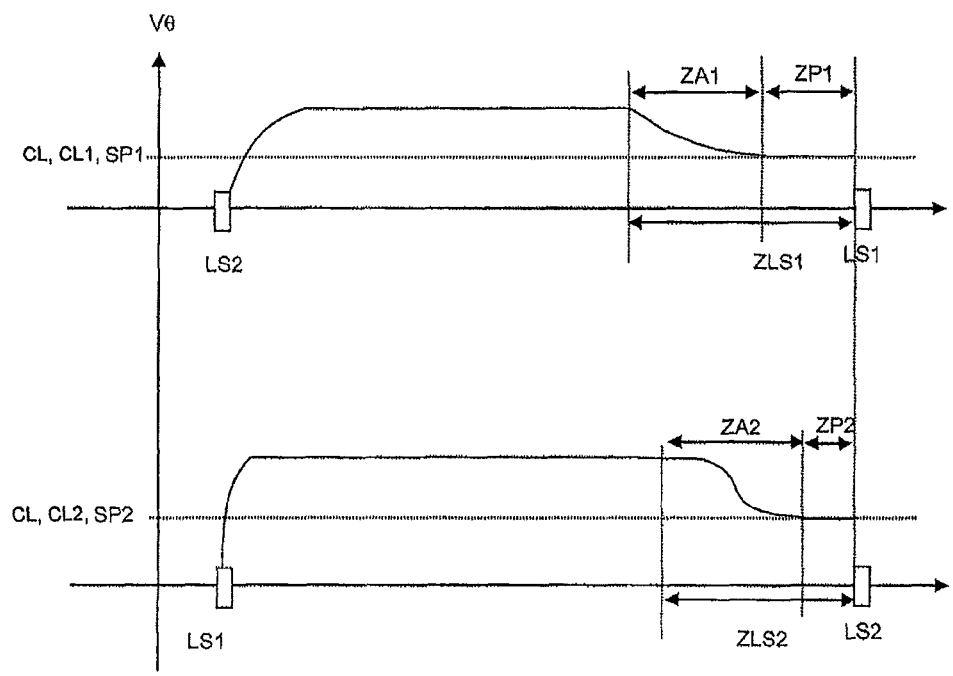
FIG. 2 represents the trends of the speed of rotation of a shaft of an actuator according to the invention according to the position of the mobile element along the travel, the mobile element being driven in a first direction and in a second direction.

FIG. 2 gives, as an indication, a control speed profile for the displacement of the final slat between the top and bottom ends of travel in the direction of displacement towards the end of travel concerned.

The decrease in speed may be linear or based on an asymptotic curve until a setpoint speed SP1 or SP2 is reached. It is not necessary for the decrease to be the same in the docking area towards the bottom end stop as in the docking area towards the top end stop.

Outside of the docking areas, the choice of the control setpoint is independent of the choice of the control setpoint in the docking areas. The control speed may be kept constant (as represented in FIG. 2, which causes the linear speed of displacement of the final slat to vary with the winding diameter and therefore with the position of the mobile element) or the speed of displacement may be kept constant.

According to the cases described in the above paragraph, the speed (control or linear) on entry into the docking area may be different. The decrease in speed in the docking area will therefore have, as starting value, this speed value on entry into the docking area and, as end value, the setpoint speed defined for each docking area. The decrease curve will therefore be defined on the basis of these two values. It may be different in the two docking areas, as represented in FIG. 2, depending on the choice of control algorithm in these areas.

It is also possible to provide a number of speed change levels in the docking area.

In this docking area, and in particular in a small area approaching the end stop, the winding radius variations are small. The control speed and the linear speed over each area are therefore comparable. It is advantageous to provide for the setpoint speed to be reached before reaching the end stop or the end-of-travel position, for example for the speed setpoint to be reached when only a portion, for example ⅔, of the docking area has been covered.

In other words, the docking area may comprise a first so-called approach area ZA1, ZA2, in which the angular speed decreases until the setpoint speed is reached and a proximity area ZP1, ZP2, in which the angular speed is substantially constant and equal to the speed setpoint defined for the corresponding docking area.

The actuator comprises hardware and/or software means used to govern its operation in a way that conforms to the method that is the subject of the invention. The software means may in particular comprise a computer program code means suitable for carrying out the steps of the method that is the subject of the invention, when the program runs on a computer. The actuator comprises a means for defining a first angular speed setpoint SP1 of the actuator in a first docking area ZLS1 and a means for defining a second angular speed setpoint SP2 of the actuator in a second docking area ZLS2. It preferentially comprises a speed regulation means for regulating the speed of rotation of its output shaft to a defined value. Also preferably, it comprises memories for storing the first angular speed setpoint and the second angular speed setpoint. The setpoint definition means may comprise computation means.

Figure 3:
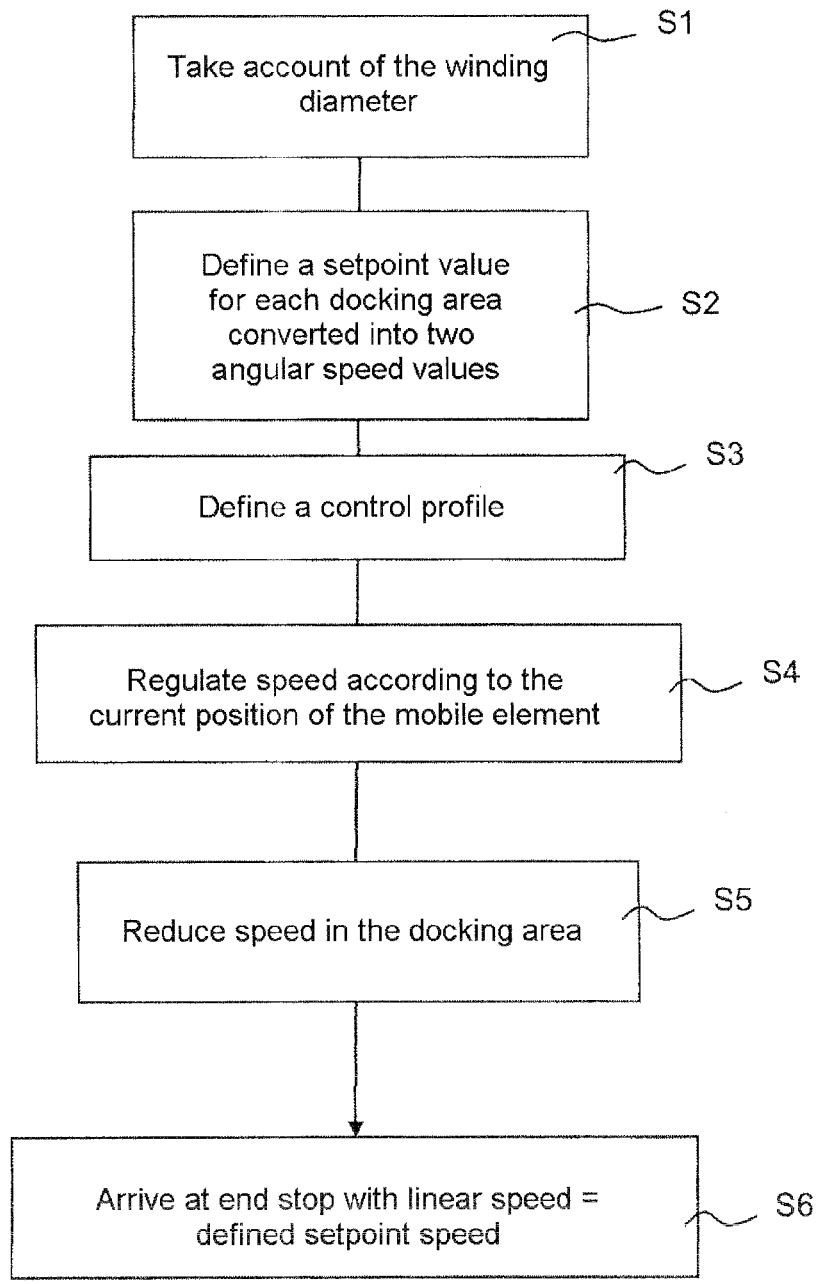
FIG. 3 is a flow diagram of an implementation of the operating method according to the invention.

One implementation of the operating method according to the invention is described hereinbelow with reference to FIG. 3.

In a step S1, a value representative of the winding diameter, for each position of the mobile element on arrival at an end of travel, is taken into account. This value representative of the winding diameter may be predetermined (average value for a standard installation, value associated with the type of actuator for example) or supplied to the installation by a particular manoeuvre, for example as described in the application WO2007/080493.

In a step S2, the linear speed setpoint values of the mobile element CL1, CL2 defined for each docking area are converted into two angular speed setpoint values SP1, SP2 at the two ends of travel, by using in particular the winding diameter values obtained during the preceding step. A common linear speed setpoint value CL may be defined for both docking areas.

The steps S1 and S2 therefore correspond to a step for defining and/or selecting two different angular speed setpoint values SP1 and SP2 that can be used to incorporate the behavioural differences of the installation in the top docking area and in the bottom docking area.

In a step S3, these angular speed setpoint values help to define a control profile for the mobile element between the two end-of-travel positions, that is to say, a trend profile or a type of trend of the angular speeds all along the travel of the mobile element and, in particular, along the docking areas.

In a step S4, a step is carried out to regulate the control speed according to the current position of the mobile element, identified by the position sensor and the control profile defined in the preceding step.

Thus, in a step S5, on entry into a docking area, the speed is reduced gradually until the speed setpoint SP1, SP2 predefined in the step S2 is reached. The mobile element therefore arrives at an end of travel with a speed of displacement that is chosen and determined in particular by the angular speed setpoints, for example a speed of displacement that is identical or substantially identical regardless of whether it is a top end of travel or a bottom end of travel, during a step S6.

Outside the docking areas, it is not necessary to regulate the control speed to obtain a constant linear speed. It is preferable to control the movement of the mobile element so as to prioritize the detection of a possible obstacle.

As in the areas starting from an end of travel, an increasing linear speed may be generated independently of the rest of the travel. The control speed may or may not then take account of the information concerning the winding diameter.

These speed setpoints can be put in place once the docking areas have been defined, in particular once the ends of travel have been reached and/or stored.

Throughout this document, the terms "setpoint" and "setpoint value" have been used interchangeably to denote a setpoint value.

The invention claimed is:

1. A method for operating an actuator (ACT) for manoeuvring a windable mobile element (COV) of a home automation appliance (EQU), the mobile element being able to be displaced between two extreme positions, the method comprising a first step for definition of a first angular speed setpoint (SP1) of the actuator in a first docking area (ZLS1) and a second step for definition of a second angular speed setpoint (SP2) of the actuator in a second docking area (ZLS2), the first and second angular speed setpoints being different, wherein at least one of the first and second angular speed setpoints is obtained from the definition of a first linear speed setpoint (CL1) of the mobile element in the first docking area (ZLS1) and/or of a second linear speed setpoint (CL2) of the mobile element in the second docking area (ZLS2), wherein the first and second linear speed setpoints are defined as a common or substantially common linear speed setpoint (CL) of the mobile element in the first and second docking areas, in particular as a common or substantially common linear speed setpoint of the mobile element on arrival at the extreme positions.

2. Operating method according to claim 1, wherein the first and second linear speed setpoints are defined by a set ratio relative to one another.

3. Operating method according to claim 1, wherein the first and second linear speed setpoints are defined by a set ratio relative to one another.

4. Operating method according to claim 1, wherein the first and second angular speed setpoints are defined by using values, in particular approximate values, of the winding diameter of the mobile element on approaching each extreme position.

5. Electromechanical actuator (ACT) for manoeuvring a windable mobile element (COV) of a home automation appliance (EQU), intended to drive the mobile element between two extreme positions, which actuator comprises hardware and/or software means (CPU, INFO-R, TAB, TQ, POS) for implementing the operating method according to claim 1.

6. Actuator according to claim 5, wherein the hardware and/or software means comprise a means for defining a first angular speed setpoint (SP1) of the actuator in a first docking area (ZLS1), a means for defining a second angular speed setpoint (SP2) of the actuator in a second docking area (ZLS2) and a means for regulating the speed of rotation of its output shaft so as to regulate the speed of the actuator to one and/or the other of the first and second setpoints.

7. Home automation installation (INST) comprising an actuator (ACT) according to claim 5 and a mobile element (COV).

8. Home automation installation (INST) comprising an actuator (ACT) according to claim 6 and a mobile element (COV).

9. A method for operating an actuator (ACT) for manoeuvring a windable mobile element (COV) of a home automation appliance (EQU), the mobile element being able to be displaced between two extreme positions, the method comprising a first step for definition of a first angular speed setpoint (SP1) of the actuator in a first docking area (ZLS1) and a second step for definition of a second angular speed setpoint (SP2) of the actuator in a second docking area (ZLS2), the first and second angular speed setpoints being different, wherein the angular or linear speed setpoint corresponding to a docking area is reached when a so-called approach area part of the docking area has been covered, in particular when ⅔ of the docking area have been covered, or wherein the angular speed of the actuator in the docking areas decreases from the entry into a docking area until the angular speed setpoint value (SP1, SP2) defined for each docking area is reached on arrival of the mobile element in each of the extreme positions.

10. Operating method according to claim 9, wherein the angular speed decreasing phases are different in the two docking areas, in particular in that the forms of the decreasing profiles are different.

11. Operating method according to claim 9, wherein the angular or linear speed remains equal to the setpoint over a so-called proximity area of the docking area.

12. Operating method according to claim 9, wherein the speeds of displacement of the mobile element are reduced in the docking areas relative to the speed of displacement over the rest of the travel.

13. Operating method according to claim 9, wherein the angular speed of the actuator outside of the docking areas is constant or substantially constant.

14. Operating method according to claim 9, wherein the first and second angular speed setpoints are defined by using values, in particular approximate values, of the winding diameter of the mobile element on approaching each extreme position.

15. Electromechanical actuator (ACT) for manoeuvring a windable mobile element (COV) of a home automation appliance (EQU), intended to drive the mobile element between two extreme positions, which actuator comprises hardware and/or software means (CPU, INFO-R, TAB, TQ, POS) for implementing the operating method according to claim 9.

16. Actuator according to claim 15, wherein the hardware and/or software means comprise a means for defining a first angular speed setpoint (SP1) of the actuator in a first docking area (ZLS1), a means for defining a second angular speed setpoint (SP2) of the actuator in a second docking area (ZLS2) and a means for regulating the speed of rotation of its output shaft so as to regulate the speed of the actuator to one and/or the other of the first and second setpoints.

17. Home automation installation (INST) comprising an actuator (ACT) according to claim 15 and a mobile element (COV).

18. Home automation installation (INST) comprising an actuator (ACT) according to claim 17 and a mobile element (COV).

* * * * *